United States Patent Office 3,382,090
Patented May 7, 1968

3,382,090
PROCESS OF MAKING HYDROPHILIC
POLYURETHANE FOAM BODY
Fred W. Meisel, Jr., Media, and Edgar Allan Blair, Swarthmore, Pa., assignors to Scott Paper Company, Philadelphia, Pa., a corporation of Pennsylvania
No Drawing. Filed May 19, 1965, Ser. No. 457,170
6 Claims. (Cl. 117—47)

ABSTRACT OF THE DISCLOSURE

This invention relates to a process for the production of hydrophilic polyurethane foam products wherein a monomer of the group consisting of acrylic acid, hydroxyethylacrylate, acrylamide, dimethylaminoethyl methacrylate and mixtures thereof is attached to a foam substrate by a graft polymerization process in which polymerization is initiated by the presence of benzoyl peroxide and dimethylamine. This reaction may advantageously take place in the presence of an oxygen scavenger such as sodium bisulfite and a wetting agent such as a polyoxyethylated polypropylene oxide.

---

This invention relates to a process for preparing hydrophilic polyuretthane foam and to the resulting product. More particularly, this invention relates to the modification of porous polyurethane foams by graft polymerization to obtain a sponge-like foam having a high degree of hydrophilicity and to the resulting product.

The expression "porous polyurethane foam" as used in this specification and in the appended claims is understood to refer to polyurethane foams which are permeable to liquids such as the open-celled polyurethane foams and the reticulated polyurethane foams. Porous polyurethane foams are characterized by having the property of permitting the penetration of liquids into the interior of the foam body. Porous polyurethane foam is to be distinguished from closed-celled polyurethane foams which do not permit the penetration of liquids into the interior of the foam body. Open-celled polyurethane foams, as is known to those skilled in the art, have membranes present on some but not all cell walls and said cells are substantially interconnecting which thereby renders the foam permeable to liquids. Reticulated polyurethanes consist of three dimensional spaced-apart nexus and strands joined to nexus substantially free from membraneous matter. They are very permeable to liquids.

Polyurethane foams are well known. Such foams generally possess high tear strength, wet or dry, and can be obtained in varying degrees of softness, flexibility and porosity. They are highly resistant to chemicals and bacterial action, and can be prepared in a wide variety of densities, shapes, pore sizes and colors. While open-cell polyurethane foams are sometimes described as sponge-like, they are of a hydrophobic character and do not absorb and hold water like a natural sponge or cellulosic products.

Conventional absorbent materials such as natural sponge, viscose or regenerated cellulose, cellulose wiping materials, chamois and others while having good wiping and absorbing characteristics for water have a very low resistance to common chemicals and are readily subject to bacterial attack and consequently deterioration. Additionally, these materials have low tear strength and are rigid and stiff when dry which renders them very susceptible to breaking and crumbling during storage and handling. Further, natural sponge products are expensive and their size and shape are limited.

A principal object of this invention, therefore, is to provide a hydrophilic porous polyurethane foam, and a process for preparing the same, which overcomes the more objectionable disadvantages of conventional absorbent or sponge-like materials.

Another object of this invention is to provide a process for converting hydrophobic porous polyurethane foams into sponge-like products having superior wiping properties and which possess a high degree of hydrophilicity rendering them capable of absorbing and retaining large quantities of water.

Another object of this invention is to provide a process for rendering porous polyurethane foam permanently hydrophilic and the product obtained thereby.

Another object of the present invention is to provide a hydrophilic porous polyurethane foam which is highly resistant to bacteria and chemicals, has high tear strength, and possesses a high degree of hydrophilicity; and which can be prepared in a wide variety of densities, porosities, shapes, sizes and colors.

Still another object is to provide a porous, sponge-like polyurethane foam which is capable of imbibing, like a chamois or cellulose wiping cloth, dispersed water from a surface.

Other objects and advantages will be apparent as the invention is hereinafter described in detail.

Briefly stated, in accordance with the present invention, hydrophilic polyurethane products of various densities, sizes, shapes and degrees of porosity can be effectively prepared by graft polymerizing a water soluble monomer onto a normally hydrophobic porous polyurethane foam. The resulting product is permanently hydrophilic and possesses excellent wiping, absorbing and water-retaining properties.

Hydrophilic sponge-like products in accordance with this invention can be prepared from any of the various porous, isocyanate-derived polymeric foams generally known as polyurethane foams. The manufacture of polyurethane foams is well known. They are generally prepared by a "1-shot" or "2-shot" (prepolymer system) procedure. In the "1-shot" foaming system all of the components of the formulation are mixed simultaneously in the mixing head of the foaming machine. Foaming machines may contain two or more feeding lines by which the foaming components are metered to the mixing head. Where only two feed lines are available, a resin premix composed of the resin, water, coupling agent (emulsifier) and catalyst is metered through one line and the toluene diisocyanate through the other line. Some machines have sufficient feeding lines going to the mixing head to allow each component of the formulation to be individually metered. One typical formulation for preparing a polyurethane foam is as follows.

| | Parts by weight |
|---|---|
| Witco fomrez No. 50 | 100.0 |
| Witco 77-86 | 2.0 |
| N-Ethyl morpholine | 2.5 |
| Water | 3.1 |
| Toluene diisocyanete (80%, 2, 4 isomer; 20%, 2, 6 isomer) | 43.0 |

A polyurethane foam in accordance with the above formulation results in a flexible foam having a density of 2 lbs./cu. ft.

Witco Fomrez No. 50 is a glycol-adipate type polyester resin having the following properties.

| | |
|---|---|
| Hydroxyl number | 49–55 |
| Acid number _____max__ | 2.0 |
| Water content (Karl Fischer) ____max__ | 0.1% |
| Color (Gardner 1933) _____max__ | 3.0 |
| Viscosity (Brookfield Model LVF, Spindle No. 4, 12 r.p.m.), 25° C. _____cps__ | 17,000–22,000 |
| Specific gravity, 25° C. | 1.19 |
| Appearance | Clear |

In accordance with the invention, the foam is suitably a polyester or polyether polyurethane having an interconnected or open-cell structure. Reticulated as well as open-celled polyurethane foams which can be used in practicing the present invention may be produced by employing reactants and methods as disclosed in U.S. Patents 2,900,278 (Powers et al.) and 3,171,820 (Volz), the disclosures of which are hereby incorporated by reference. Hydrophilicity of foams mentioned in the above patents may be improved only to a certain degree. Thereafter a satisfactory improvement in hydrophilicity may be obtained only by grafting in accordance with the present invention.

The physical features of the hydrophilic porous polyurethane foams which can be rendered hydrophilic by the present invention may vary widely in accordance with the characteristics desired in the final product. Thus, the foam material to be modified may vary from very flexible thin sheets to semi-rigid and rigid block and cube-shaped cellular structures. It is a meritorious feature of this invention that modification of the foam by graft polymerization according to the process described hereinafter does not significantly detract from the inherent flexibility and other valuable properties of the unmodified hydrophobic polyurethane. The cellular structure of the foam may vary from relatively dense minute open-celled polyurethanes to very low density highly reticulated polyurethane foams. The reticulated structures are preferred.

In carrying out the present invention, it has been found advantageous, but not necessary, to compress and heat set the open-celled or reticulated foam prior to graft polymerization. This pre-treatment of the foam may be accomplished as described in the disclosure of U.S. patent application Ser. No. 423,848, filed Jan. 6, 1965 and now abandoned. When open-celled polyurethane foam is compressed, there is apparently a tendency to decrease the cell size and to increase the wall area of the strands or membranes forming the cell. When the compressed foam is rendered hydrophilic in accordance with the present invention, the overall effect is to create absorptive properties and wiping characteristics superior to comparable cellulose products. For example, when a 100 p.p.i. (pores per inch) reticulated polyurethane foam is compressed from ⅝ inch to ⅛ inch in depth, by the method described in the above patent application, and rendered hydrophilic via graft polymerization in accordance with the present invention, the resulting material shows superior absorptive and wiping characteristics when compared with typical cellulose wiping cloths.

Conversion of normally hydrophobic porous polyurethane foam in accordance with the present invention is accomplished by a graft polymerization process. One method of conducting the process is to submerge the foam into an aqueous solution containing the polymerizable monomer and polymerization initiating system. While it is not necessary, the foam may be mechanically worked, as by kneading, while it is submerged in the solution. When employed, kneading or mechanical working of the foam may be continuous or periodic.

An alternative method of effecting the graft polymerization is to impregnate or saturate the foam with a solution of the polymerization initiating system and thereafter contact the foam with a polymerizable monomer such as by submerging the foam into a solution of the monomer.

After polymerization has proceeded for a sufficient time which may range from a few minutes to several hours, the foam may optionally be washed as by kneading or mechanically worked in water or by a pressurized water spray to remove any homopolymer which may form during the process. Thereafter, the foam may be dried at room temperature in the presence of a forced draft or at elevated temperatures.

It has been found that graft polymerization of the normally hydrophobic, open-cell foam can advantageously be accomplished by a polymerization initiating system comprising an organic peroxide such as benzoyl peroxide and a compound such as dimethyl aniline (DMA), or any other tertiary amine commonly used as a promoter in free radical polymerization as the basic components. The graft polymerization is initiated by free radicals which are included in the products of decomposition of, for example, benzoyl peroxide and DMA. The amount of each of these components necessary to effect polymerization is usually about 2% by weight of the monomer in the polymerization medium. The amount of initiating system components necessary is subject to wide variation as is well known to those skilled in the art and will vary in accordance with the type and amount of monomer used, the reaction temperature, the reactive sites on the foam to be grafted, and other factors.

It has been found advantageous to include in the polymerization system a small amount of sodium bisulphite or other materials commonly used as oxygen scavengers in free radical polymerizations. The amount of agent may vary widely from one system to another. An amount of about 1% by weight of the water or solvent phase of the polymerization system has been found satisfactory.

Wetting agents in small amounts may also be included in the polymerization system. A wetting agent is not necessary but it has been found that the uniformity of the graft is improved when a wetting agent is present in the system. The amount of wetting agent may suitably be about 0.5% based on the weight of water or other solvent used in the polymerization system. As the wetting agent, Pluronic L-35, manufactured by Wyandotte Chemical Co., Wyandotte, Mich., has been found satisfactory. Pluronic L-35 is polyethoxylated polypropylene oxide. Other suitable wetting agents include sodium alkyl sulfates, polyethoxylated fatty acids, sodium alkylaryl sulfonates, polyethoxylated alkyl phenols among others.

Among the suitable monomers which may be used in the process of the present invention are the water soluble and water miscible unsaturated monomers such as acrylic acid, hydroxyethyl acrylate, acrylamide, and dimethylaminoethyl methacrylate. Mixtures of the foregoing monomers may be used such as various ratios of acrylic acid with hydroxyethyl acrylate and dimethylamino ethyl methacrylate with acrylic acid. Other monomers which may be employed are methacrylamide, polyethylene glycol acrylates and methacrylates, analogous derivatives of chloroacrylic acid and cyanoacrylic acid, ethacrylic acid, mono-esters of maleic and fumaric esters with ethylene and polyethylene glycols. Still other suitable monomers which can be polymerized to polymers having hydrophilic properties will be obvious to those having ordinary skill in the art and can be substituted for the aforementioned preferred monomers.

The amount of monomer present in the polymerization system may vary widely. It has been found that the percent of graft pickup by the foam is favored by an increase in the concentration of monomer in the polymerization system for a given ratio of monomer to foam. While it is favorable to use as high a monomer concentration as possible, the upper limit of the most favorable concentration will be limited by such factors as economy and type of process equipment available. With the foregoing considerations in mind, it has been found that the concentratio of monomer may vary from about 1% to about 15% or higher by weight of the polymerization medium and the ratio of monomer to foam may suitably be about 1.5:1 by weight. Other concentrations and ratios of monomer to foam may be used:

When an unsaturated water soluble and/or water miscible acid is employed in the process of the invention, the grafted acids or mixtures may be converted to their salt form by reaction with a suitable alkali or alkaline base. The conversion may be accomplished by, for example, submerging the grafted foam in a sodium bicarbonate bath. Foams treated in this manner usually will swell to a greater extent than the unconverted grafted foams. Among the materials suitatble for converting the acid groups are sodium or potassium carbonate, potassium acetate, calcium acetate and the like.

The degree of hydrophilicity imparted to the foam may vary widely and can be adjusted in accordance with the desired utility of the modified foam. Thus, if a modified foam having only a slight degree of water absorption and retention is desired, the extent of graft pickup is accordingly limited. Modified foams having a dried weight percent increase indicative of graft pickup of 5% or lower to 115% or higher can be prepared by the process of the present invention.

In carrying out the process of the present invention it is preferred that graft polymerization take place in a nitrogen atmosphere. However, if conditions do not permit, the process may be operated opened to the atmosphere. The process may be conducted in any suitable apparatus which advantageously has provision for agitating the foam specimen and/or polymerization medium. Agitation during the process is advantageous in that it promotes uniformity and maximum graft pickup throughout the cellular structure.

It is generally satisfactory to conduct the process at room temperature. Higher or lower temperatures can be employed if desired.

The process of this invention is adaptable to modifying foam structures of an undetermined length on a continuous basis or to modifications of individual pre-cut pieces of foam.

As indicated hereinabove, modification of hydrophobic, porous polyurethane foam in accordance with the invention can be accomplished by submerging the foam into a bath containing the monomer and polymerization initiatig system. One method of preparing the polymerization system or bath is to prepare it in three parts which are thereafter combined. Thus, each of the basic components of the polymerization initiating system can be separately mixed with one-half or part of the monomer. If an oxygen scavenger is to be included, it may be dissolved in the water phase of the system. Thereafter, the monomer portions containing the polymerization initiating components are added separately with agitation to the solvent phase of the polymerization system. It has been found preferable to first add the monomer portion containing the organic peroxide.

The following examples serve to illustrate the invention and should not be regarded as unduly limiting the invention. Unless otherwise indicated, all parts are expressed in parts by weight.

Example 1

Reticulated polyester urethane foam having 80–100 pores per linear inch which had been prepared and compressed about five fold as described in U.S. patent application Ser. No. 423,848, was treated as follows. A specimen having the measurements 60 inches by 7 inches by 1/8 inch and weighing 126 grams was submerged in a polymerization system comprising 189 grms. of acrylic acid, 3.78 grms. of benzoyl peroxide, 3.78 grms. of dimethyl aniline, 28.1 grms. of sodium bisulfite, 14.05 grms. of Pluronic L-35 (wetting agent manufactured by Wyandotte Chemical Co., Wyandotte, Michigan), and 2811.0 grms. of water. After 17 hours with continuous agitation of the solution, the specimen was removed and washed free of homopolymer. Dried to constant weight, the specimen weighed 155.0 grms., an increase of 23.0%. The acidic groups in the treated specimen were converted to the sodium salt by submerging the specimen in a sodium bicarbonate bath.

The treated specimen wet rapidly in contrast to the untreated material which resists wetting. The treated specimen swelled when wet and the surface area increased 50%.

A comparison of the water holding capacity with the non-treated material and a typical commercially available cellulose cloth was made as follows. Specimens of the three materials were saturated with water and put through an automatic wringer at maximum pressure. While damp, specimens of equal dimensions were cut from each of the materials and these were again saturated with water. The specimens were allowed to drain lengthwise until drainage did not exceed 1 drop per minute at which point they were weighed. The difference in "damp" weight and "drip-dry" weight was recorded and are shown in Table 1.

TABLE 1

| Specimen | Damp Wt. (grms.) | Drip-Dry (grms.) | Difference (grms.) |
|---|---|---|---|
| Cellulose | 6.18 | 22.40 | 16.22 |
| Non-treated | 6.86 | 18.41 | 11.55 |
| Treated | 6.39 | 27.40 | 21.21 |

The water-holding capacity was greatly improved over the non-treated specimen and as shown in Table 2 is considerably better than the cellulose material.

TABLE 2

| Specimen | Water held per gram | Water held per cu. in. (grms.) |
|---|---|---|
| Cellulose | 2.80 | 10.2 |
| Non-treated | 1.94 | 7.4 |
| Treated | 3.26 | 12.7 |

Example 2

Reticulated polyester urethane foam as described in Example 1 was treated as follows. A sample having the measurements 72 inches by 6 inches by 1/8 inch and weighing 131.5 grms. was continuously dipped and squeezed from a reaction mixture via an automatic laundry wringer for 1½ hours in an atmosphere of nitrogen. The reaction mixture consisted of 197.25 grms. of acrylic acid, 3.95 grms. of benzoyl peroxide, 3.95 grms. of dimethyl aniline, 30.1 grms. of sodium bisulfite, 15.0 grms. of Pluronic L-35 and 3,090 grms. of water. Following the 1½ hour cycle, the sample was removed and washed free of homopolymer. Dried to constant weight, the specimen weighed 165.30 grms., an increase of 25.8%. The acidic groups in the treated specimen were converted to the sodium salt by submerging the specimen in a sodium bicarbonate bath.

The treated specimen wet rapidly in contrast to untreated material which resists wetting. The treated specimen swelled when wet and the surface area increased 59.0%.

The absorbency and wiping performance of samples cut from the treated specimen compared favorably with a commercially available natural chamois.

Example 3

Reticulated polyester urethane foam having 80–100 pores per linear inch which had been prepared and compressed seven fold as described in U.S. patent application Ser. No. 423,848 was treated as follows. A sample having the measurements 10 inches by 7 inches by 1/8 inch and weighing 30.36 grms. was "milked" by rolling with a roller in a reaction mixture consisting of 55.56 grms. of acrylic acid, 1.1 grms. of benzoyl peroxide, 1.1 grms. of dimethyl aniline, 7.1 grms of sodium bisulfite, 3.5 grms. of Pluronic L-35 and 711.5 grms. of water. The system was contained in a nitrogen atmosphere.

After 1½ hours, the sample was removed and washed free of homopolymer. Dried to constant weight the specimen weighed 36.38 grms., an increase of 19.8%.

In the acidic condition and dry, the treated specimen had increased in volume approximately 28%. When wet the volume increase was 38.5%. The acidic groups in the treated specimen were converted to the sodium salt by submerging in a sodium bicarbonate bath after which the wet volume increase over original was 41.75%. The wiping action of the finished material compared favorably with a commercially available natural chamois.

Example 4

A sample of reticulated polyether urethane foam prepared as described in U.S. application serial No. 423,848, having the measurements 16¾ inches by 7 inches by ³⁄₃₂ inches and weighing 51.3 grms. was submerged in a mixture consisting of 153.9 grms. of acrylic acid, 3.1 grms. of benzoyl peroxide, 3.1 grms. of dimethyl aniline, 28.5 grms. of sodium bisulfite, 14.25 grms. of Pluronic L–35 and 2846 grms. of water. After 17 hours with continuous agitation of the solution, the sample was removed and washed free of homopolymer. Dried to constant weight, the specimen weighed 93.0 grms., an increase of 81.5%.

The treated specimen swelled when wet with water and the surface area increased 72.5%. The foam has an ion exchange capacity of 5 millimoles per gram as a cation exchanger.

Example 5

A sample of reticulated polyester urethane foam prepared as described in U.S. application Ser. No. 423,848 having the measurements 10 inches by 7 inches by 1 inch having 80 pores per linear inch and weighing 30.5 grms. was treated as follows. The sample was submerged in a mixture consisting of 91.5 grms. of acrylic acid, 1.83 grms. of benzoyl peroxide, 1.83 grms. of dimethyl aniline, 39.1 grms. of sodium bisulfite, 19.55 grms. of Pluronic L–35 and 3921 grms. of water. The sample was milked periodically in the mixture for 2½ hours and the system aged 17 hours. After 17 hours, the sample was washed free of homopolymer. Dried to constant weight, the sample weighed 38.0 grms., a 24.5% increases.

Example 6

A sample of non-reticulated, open-celled, compressed polyester urethane foam prepared as described in U.S. application Ser. No. 423,848 having the measurements 10 inches by 7 inches by 1 inch having 80 pores per linear inch and weighing 36.74 grms. was treated as follows. The sample was submerged in a mixture consisting of 110.22 grms. of acrylic acid, 2.2 grms. of benzoyl peroxide, 2.2 grms. of dimethyl aniline, 38.0 grms. of sodium bisulfite, 19.0 grms. of Pluronic L–35 and 3800 grms. of water. The system was contained in an atmosphere of nitrogen and the specimen milked continuously in the mixture for 2½ hours. After 2½ hours, the sample was washed free of homopolymer and dried to constant weight. The treated sample weighed 48.79 grms., an increase of 32.8%.

Example 7

Four samples of reticulated dual cell polyester polyurethane foam purchased from commercial sources and reticulated according to U.S. 3,171,820 each having the measurements 5 inches by 3 inches by 1 inch and weighing a total of 47.7 grms. were submerged in a mixture consisting of 143.1 grms. of acrylic acid, 2.9 grms. of benzoyl peroxide, 2.9 grms. of dimethyl aniline, 27.2 grms. of sodium bisulfite, 13.6 grms. of Pluronic L–35 and 2718 grms. of water. After 17 hours with continuous agitation, the samples were removed and washed free of homopolymer. Dried to constant weight, the specimens showed weight gains that varied from a low of 24% to a high of 49% dependent on their position in the flask and as a result the flow of mixture through the specimen.

The treated specimens all wet rapidly in contrast to untreated material which resisted wetting. The specimens swelled when wet and the absorbing and wiping action of all compared favorably with commercially available cellulose sponges.

Example 8

A series of reticulated polyester and polyether urethane foam samples purchased from commercial sources and reticulated according to U.S. patent application Ser. No. 324,578, filed Nov. 18, 1963, were treated by submerging them in a mixture consisting of acrylic acid, benzoyl peroxide, dimethyl aniline, sodium bisulfite, Pluronic L–35 and water. The benzoyl peroxide content of the mixture was a constant 2% of the acrylic acid as was the dimethyl aniline content. The sodium bisulfite content of the mixture was a constant 1% of the water content and the Pluronic L–35, a constant ½ of 1% of the water content. The acrylic acid and water contents of the mixture were varied to show the effects of varying the ratio of acrylic acid to foam weight at a constant concentration of acrylic acid in the reaction mix and to show the effect of varying the acrylic acid concentration in the reaction mix at a constant ratio to foam weight. All samples were washed free of homopolymer and dried to constant weight to establish weight gain data. Data obtained is contained in Table 3.

TABLE 3

| Ratio Acrylic Acid to Foam Wt. | Percent Acrylic Acid | Percent Weight Increase |
|---|---|---|
| 1½–1 | 6.0 | 24.5 |
| 1½–1 | 2.07 | 18.3 |
| 1½–1 | 1.51 | 13.9 |
| 1½–1 | 1 | 8 |
| 3–1 | 0.8 | 15 |
| 3–1 | 2.3 | 30 |
| 3–1 | 4.5 | 47 |

Example 9

Reticulated and compressed polyester urethane foam as described in Example 1 was treated as follows. A sample having the measurements 72 inches by 7 inches by ⅛ inch weighing 149.7 grms. was continuously dipped and squeezed from a mixture via an automatic laundry wringer for ¾ hour in an atmosphere of nitrogen. The reaction mixture consisted of 224.6 grams. of hydroxyethyl methacrylate, 4.5 grms. of benzoyl peroxide, 4.5 grms. of dimethyl aniline, 35.2 grms. sodium bisulfite, 17.6 grms. of Pluronic L–35 and 3518.7 grms. of water. Following the ¾ hour cycle, the sample was removed and washed free of homopolymer. Dried to constant weight the specimen weighed 334.0 grms., and increase of 123.0%.

Example 10

Reticulated polyester urethane foam prepared as described in Example 1 was treated as follows. A sample having the measurements 72 inches by 7 inches by ⅛ inch weighing 126.3 grms. was continuously dipped and squeezed from a mixture via an automatic laundry wringer for 1 hour in an atmosphere of nitrogen. The reaction mixture consisted of 63.2 grams of hydroxyethyl methacrylate, 63.2 grms. of acrylic acid, 2.5 grms. of benzoyl peroxide, 2.5 grams. of dimethyl aniline, 24.0 grms. of sodium bisulfite, 12.0 grms. of Pluronic L–35 and 2403.7 grms. of water. Following the 1 hour cycle, the sample was removed and washed free of homopolymer. Dried to constant weight, the specimen weighed 176.8 grms., an increase of 40%. The acidic group in the treated specimen were converted to the sodium salt by submerging the specimen in a sodium bicarbonate bath.

Example 11

Reticulated polyester urethane foam having 80–100 pores per linear inch prepared and compressed three fold according to U.S. application Ser. No. 423,848 was treated as follows. A sample having the measurements 72 inches by 6 inches by ⅛ inch and weighing 73.4 grms. was continuously dipped and squeezed from a mixture via an automatic laundry wringer for 2½ hours in an atmosphere of nitrogen. The reaction mixture consisted of 55.05 grms. of dimethylaminoethyl methacrylate, 55.05 grms. of acrylic acid, 2.2 grms. of benzoyl peroxide, 2.2 grams of dimethyl aniline, 20.9 grams. of sodium bisulfite, 20.9 grms. of Pluronic L-35 and 2092.0 grms. of water. Following the 2½ hour cycle, the sample was removed and washed free of homopolymer. Dried to constant weight, the specimen weighed 86.0 grms., an increase of 17.4%.

Example 12

Reticulated polyester urethane foam as described in Example 1 was treated as follows. A sample having the measurements 10 inches by 7 inches by ⅛ inch and weighing 20.22 grms. was submerged in a mixture consisting of 60.7 grms. of acrylamide, 1.2 grams of benzoyl peroxide, 1.2 grams of dimethyl aniline, 75.0 grams of acetic acid, 19.6 grms. of sodium bisulfite, 10.0 grms. of Pluronic L-35, 0.3 grms. of mercapto succinic acid and 1961.3 grms of water. The system was contained in an atmosphere of nitrogen and the specimen was milked semi-continuously in the mixture for 3 hours. Following the 3-hour cycle, the sample was removed and washed free of homopolymer. Dried to constant weight, the specimen weighed 23.04 grms., an increase of 13.9%. The mercapto succinic acid is a molecular weight regulator recommended to limit the molecular weight of the polymer. The acetic acid is a solvent for the benzoyl peroxide.

What is claimed is:

1. A process for the manufacture of a hydrophilic polyurethane foam comprising the steps of: reacting a polyurethane body with an aqueous solution of a monomer selected from the group consisting of acrylic acid, hydroxyethylacrylate, acrylamide, dimethylaminoethyl methacrylate and mixtures thereof in the presence of benzoyl peroxide and dimethyl aniline, wherein the amount of benzoyl peroxide is about 2% by weight of the monomer, and the amount of dimethylaniline is about 2% by weight of the monomer.

2. A process as set forth in claim 1 wherein the concentration of said monomer is in the range from about 1% to about 15% by weight of said aqueous solution and the ratio of monomer to foam is about 1.5:1 by weight.

3. A process as set forth in claim 1 wherein the reaction is carried out in the presence of a small amount of an oxygen scavenger and a small amount of a wetting agent.

4. A process as set forth in claim 1 wherein the monomer is acrylic acid and including the further step of converting the acid to its sodium salt.

5. A process for producing hydrophilic polyurethane foam comprising the steps of: impregnating a body of polyurethane foam with a solution including benzoyl peroxide and dimethylaniline and subsequently reacting said foam with a solution of a monomer selected from the group consisting of acrylic acid, hydroxyethylacrylate, acrylamide, dimethylaminoethyl methacrylate and mixtures thereof, wherein the amount of benzoyl peroxide is about 2% by weight of the monomer, and the amount of dimethylaniline is about 2% by weight of the monomer.

6. A process for producing hydrophilic polyurethane foam comprising the steps of: reacting a polyurethane body with an aqueous solution of a monomer selected from the group consisting of acrylic acid, hydroxyethylacrylate, acrylamide, dimethylaminoethyl methacrylate and mixtures thereof wherein the concentration of the monomer is in the range from about 1% to about 15% by weight of said aqueous solution and the ratio of monomer to foam is about 1.5:1 by weight, in the presence of benzoyl peroxide and dimethylaniline each in the amount of about 2% by weight of the monomer, and sodium bisulfite in the amount of about 1% by weight of the monomer solvent and a polyoxyethylate polypropylene oxide wetting agent in the amount of about 0.5% by weight of the monomer solvent.

References Cited

UNITED STATES PATENTS

| 2,900,278 | 8/1959 | Powers et al. | 117—98 |
| 2,959,569 | 11/1960 | Warrick. | |
| 3,008,918 | 11/1961 | Stanton et al. | |
| 3,149,000 | 9/1964 | Beicos | 117—98 |
| 3,224,899 | 12/1965 | Wilson | 117—138.8 |
| 3,249,465 | 5/1966 | Chen | 117—138.8 |
| 2,762,735 | 9/1956 | Werner et al. | 260—78.5 |

FOREIGN PATENTS

| 1,109,877 | 6/1961 | Germany. |

MURRAY KATZ, *Primary Examiner.*